United States Patent Office 2,901,398
Patented Aug. 25, 1959

2,901,398

ION-EXCHANGE PURIFICATION OF ALLERGENIC POLLEN COMPONENT

Ely Perlman, Roslyn Heights, N.Y., assignor to Mount Sinai Hospital Research Foundation, Inc., New York, N.Y., a membership corporation of New York No Drawing. Application June 19, 1952
Serial No. 294,487

6 Claims. (Cl. 167—78)

This invention relates to improvements in the recovery of relatively purified pollen components and more particularly seeks to provide a pollen purification process that utilizes synthetic ion exchange resins.

It is now well established that many allergenic manifestations in man such as aestival catarrh (hay fever) rhinitis, conjunctivitis, asthma and others are caused by air-borne ragweed, grass, tree and other pollens. The various pollens are comprised of many components with allergenic activity probably restricted to a few or possibly even a single component. Since very minute amounts of allergenic products elicit reactions in individuals, and since the same product will elicit different responses from one patient to another, it has been very difficult, and in fact impossible, to isolate and/or identify the active components of pollens, although much research has been directed to the problem.

Ragweed pollen has received the greatest attention in the past few years. The ragweed pollen grain consists of an outer cell wall, an inner cell wall and the cell which contains two nuclei and cytoplasm. Within the cell wall is a considerable amount of pollen oil. However, indications are that the cytoplasm of ragweed and other pollens probably contain most, if not all, of the allergenic component or components. Many of the cytoplasm constituents are readily extractable with water, physiological saline or buffers. Thus, at the present time, crude pollen extracts are generally produced by defatting a pollen, e.g., by an ether extraction, and then making a water extraction of the remaining pollen. The defatting process is not absolutely necessary prior to the water extractions but the effect of the latter is increased many times thereby because water and the fat, which is in the cell wall, are immiscible. This water extract may then be precipitated by various agents, especially if a solid material is desired. These crude extracts in either solid or liquid form are extensively used at the present time both to test and treat individuals, although no accepted method of standardization has been developed.

In addition to these crude water extracts, other workers have devised other methods in attempting to isolate or extract an active component, and some workers have contended that a homogeneous or pure extract was obtained. However, electrophoretic and chromatographic studies reveal that none of the prior fractions have been chemically pure or homogeneous but instead contain several components. Not only are there many components but several of the components seem to exhibit allergenic activity. Of course, this might be caused by a small amount of a single active component which may split into several parts, some of which may retain their activity.

In a chromatographic analysis of a crude water extract of ragweed pollen reported by me in the Bulletin of the New York Academy of Medicine, September 1951, second series, vol. 27, No. 9, pp. 586–589, I have revealed 22 components with various degrees of allergenic activity, ranging from nil to an extensive reaction on every sensitive subject tested. However, there was a marked degree of difference between a single most active component and the group of components which exhibited mild activity on all or practically all of the sensitive subjects.

Thus, it can be seen that the isolation of the pure active constituent or constituents of allergenic material has been the goal of numerous investigators for many years because it will not only be helpful in the testing and treatment of sensitive subjects, but perhaps give a basic insight into the physiology and pathology of allergic reactions.

It is a primary object of this invention to provide a method for the isolation of a relatively pure pollen component.

It is a further primary object of this invention to provide a method to isolate a relatively pure pollen component by utilizing synthetic ion exchange resins.

I have discovered that if a crude water extract of defatted pollen is treated with synthetic ion exchange resins, the resulting filtrate contains a component that is highly allergenic and apparently about 85–90% pure. The component may be precipitated with acetone, ethyl alcohol, or methyl alcohol to yield a solid product which is possibly slightly purer.

It is of course understood that in dealing with biologically active material the chemical processes involved must be extremely gentle or the material will lose its activity and/or break down into simpler compounds. This is particularly true of protein derived compounds which is probably what my purified component represents. Thus very gentle conditions are dictated throughout the process.

The removal of impurities by the synthetic resins is best carried out in a mixture of cation and anion type exchangers, instead of using the resins in a series. The latter method probably tends to be destructive of the active component but in using a mixture of resins I get a complete cationic and anionic adsorption in a mild environment because the opposed resins tend to neutralize the harsh effects of each other. A single gentle resin might well be used also. Undoubtedly various combinations of synthetic resins can be used, even more than two in a particular mixture, and resins manufactured by other producers, but the mixture disclosed hereinafter in the example has given the most active and apparently the least contaminated extract in my experiments. However, I do not intend to be limited to the use of a particular mixture. The fundamental discovery herein is that a mixture of synthetic ion exchange resins can separate a relatively pure component from pollen without destruction or inactivation of that component. It is possible that the producers of these resins will, in the future, produce resin mixtures such as I use as a single product.

The pH of the resin extraction stage ordinarily should be kept from about five to about eight and preferably a little below seven. Moreover, the subsequent steps of precipitation and drying must be carried out gently also. It is possible that the 10 to 15% impurities may be mostly derived from the main component being partially broken down during the process even though the steps are as gentle as possible to remove the many other components of the pollen.

There are some chemical indications as to the nature of the molecule of my purified component which, of course, are not absolute so that a limitation on my invention should not be implied therefrom. The nitrogen content of the purified component is about 4.6%, which would indicate that the molecule is about 25% polypeptides if we make allowance for about 15% impurities in the component. After hydrolysis of the purified component there is about 50% reducing sugars which indicates that the molecule originally contains about 50% polysaccharides. The remaining 25% is thought to be pigment attached to the molecule, probably a flavone, since the material fluoresces in ultra violet light.

The following example illustrates how the process of this invention may be carried out.

60 grams of defatted ragweed pollen is placed in 300 cc. of water for two hours at room temperature and then filtered. The filtrate is then placed for several hours in a prepared mixture of 40 grams "Amberlite IRA–400" freshly generated with hydrochloric acid and 20 grams of "Amberlite IR–120" freshly generated with ammonium hydroxide. The solution is then decanted, yielding about 185 cc., and is then cooled to about 4° C. About 750 cc. of acetone is added to yield a precipitate which is separated by centrifugation and dried in a desiccator over phosphorous pentoxide and concentrated sulphuric acid. It is then redissolved in a small volume of water and redried by lyophilization (vacuum drying from the frozen state). The yield is approximately 450 milligrams or about three-fourths of 1% of the starting defatted pollen material.

"Amberlite" is a trademark of the Rohm & Haas Company, Washington Square, Philadelphia 5, Pa., and is also the trade name by which the art recognizes a group of synthetic ion exchange resins marketed by this particular company. "IRA–400" is a strongly-basic anion exchanger formed from a copolymer base of a styrene polymer cross-linked with divinyl benzene which base is haloalkylated with —$CH_2Cl$ groups which are aminated with trimethyl amine to form a quaternary ammonium compound having amino groups as the polar groups. The manufacture of such a resin is described in Pat. No. 2,591,573, dated April 1, 1952. "IR–120" is a strong-acid cation exchanger with a similar copolymer base which is sulfonated to introduce sulfonic acid groups into the aryl nucleus as the polar groups. The manufacture of such a resin is described in Pat. No. 2,366,007, dated December 26, 1944. The combination letter and numerical designation, such as "IR–120" or "IRA–400," represents a definite and constant product. When any improvements or variations are made by the manufacturers, a new designation is given so that users of the resins can always rely on receiving a definite product. A more detailed analysis of these synthetic resin ion exchangers is not presently available from the manufacturer.

Injections of this material in the skin of sensitive patients reveal it to be of much greater allergenic activity than crude water ragweed extract when compared on a dry weight basis.

Chromatographic analysis reveals this material to be about 90% pure. An ash determination reveals only 3.7% inorganic salt contamination, whereas the crude water extract has 17% salt. An electrophoretic analysis shows about 10 to 15% contamination, there being two impurities, one of which is evidently the inorganic salt.

I claim:

1. In a method for recovering an active pollen component, the step of mixing an undegraded pollen solution with a mixture of a synthetic anion exchange resin and a synthetic cation exchange resin in such proportions relative to each other to maintain the resultant pH of the solution within a range of 5 to 8 whereby substantially only said active component to be recovered remains in said solution unabsorbed by said resin mixture.

2. A method as claimed in claim 1 wherein said anion resin is strongly basic and said cation resin is strongly acidic.

3. A method for recovery of an active ragweed pollen component comprising defatting said pollen, extracting said defatted pollen with water, mixing said water extract with a mixture of a strongly basic synthetic anion exchange resin and a strongly acidic synthetic cation exchange resin in such proportions relative to each other to maintain the resultant pH of the solution within a range of 5 to 8, removing said resin mixture from said extract, and subsequently recovering said active component from said extract.

4. A method as claimed in claim 3 wherein each of said resins has a copolymer base of a styrene polymer cross-linked with divinyl benzene, said cation resin having sulfonic acid polar groups and said anion resin having quaternary amino polar groups.

5. A method as claimed in claim 4 wherein said mixture comprises about two parts of said anion resin to one part of said cation resin.

6. A method for recovery of an active ragweed pollen component comprising defatting said pollen by an ether extract, extracting said defatted pollen with water, mixing said water extract within a pH range of 5 to 8 with a mixture of a strongly basic synthetic anion exchange resin and a strongly acidic synthetic cation exchange resin, each of said resins having a copolymer base of a styrene polymer cross-linked with divinyl benzene, said cation resin having sulfonic acid polar groups, said anion resin having quaternary amino polar groups, said mixture comprising about two parts of said anion resin to one part of said cation resin, removing said resins from said water extract, cooling said water extract to about 0° to 10° C., adding acetone to said cooled water extract to precipitate said active component, separating said active component from the solution, and drying said active component under gentle conditions.

References Cited in the file of this patent

UNITED STATES PATENTS

| | | |
|---|---|---|
| 2,316,311 | Boatner | Apr. 13, 1943 |
| 2,461,505 | Daniel | Feb. 15, 1949 |
| 2,500,145 | Ferguson | Mar. 14, 1950 |
| 2,669,559 | Reid | Feb. 16, 1954 |